United States Patent Office 3,565,975
Patented Feb. 23, 1971

3,565,975
VINYLIDENE CHLORIDE POLYMER
COMPOSITIONS
Frank V. Goff, Sanford, Fred Stevenson, Beaverton, and William H. Wineland, Midland, Mich., assignors to The Dow Chemical Company, Midland, Mich., a corporation of Delaware
No Drawing. Filed July 3, 1969, Ser. No. 839,095
Int. Cl. C08f 37/18
U.S. Cl. 260—897        4 Claims

ABSTRACT OF THE DISCLOSURE

This invention is directed to improved polymeric compositions comprising in intimate blended combination:

(1) from about 88 to 99.5 percent by weight, based on the total weight of the composition, of a normally crystalline vinylidene chloride polymer containing from about 70 to about 95 percent by weight of vinylidene chloride,
(2) from about 0.25 to 6 percent by weight of an ethylene polymer of
   (a) from about 100 to 58 percent by weight ethylene and
   (b) between about 0 to 42 percent by weight of vinyl acetate, and
(3) from about 0.25 to about 6 percent by weight of a second interpolymer of from about 0 to 91 percent by weight of vinyl chloride and from about 100 to 9 percent by weight of vinyl acetate. These compositions provide shaped articles having unexpectedly enhanced resistance to tear.

Polymers and copolymers of vinylidene chloride have found wide use particularly in the preparation of polymeric film materials. Such films possess many useful properties such as inertness, ability to be heat sealed, transparency, shrinkability and low water vapor transmission rates which are especially adapted for packaging foodstuffs. It is desirable, however, to enhance the tear strength of such vinylidene chloride polymer films without adversely affecting the advantageous properties thereof.

Accordingly, it is a principal object of this invention to provide polymeric compositions based on polymers of vinylidene chloride which can be easily extruded into films, tubes and the like by conventional extrusion techniques, which films have significantly enhanced tear strengths while retaining their desirable properties.

It is a further object to provide polymeric film materials, and other shaped articles, having enhanced tear strengths as well as reduced oxygen transmission rates.

It is an additional object to provide polymeric film materials having the desirable properties described herein which are comprised of individual, separable film layers.

These, as well as other objects and advantages, are obtained in and by the practice of the present invention wherein an improved vinylidene chloride polymer composition is provided comprising in intimate blended combination, (1) From about 88 to 99.5 percent by weight, based on the total weight of the composition of a normally crystalline vinylidene chloride polymer containing from about 70 to about 95 percent by weight of vinylidene chloride interpolymerized with from about 30 to 5 percent by weight of one or more monoethylenically unsaturated monomers copolymerizable with vinylidene chloride.
(2) From about 0.25 to 6 percent by weight of the composition of an ethylene polymer consisting of
   (a) from about 100 to 58 percent by weight ethylene and
   (b) between about 0 to 42 percent by weight of vinyl acetate and
(3) From about 0.25 to about 6 percent by weight of the composition of an interpolymer containing from about 0 to 91 percent by weight of vinyl chloride and from about 100 to 9 percent by weight of vinyl acetate.

Typical of the vinylidene chloride polymers useful in the present invention are the normally crystalline materials containing from about 70 to 95 percent by weight of vinylidene chloride with the remainder being composed of one or more monoethylenically unsaturated comonomers exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, allyl esters and ethers, butadiene and chloroprene. Known ternary compositions also may be employed advantageously. Representative of such polymers are those composed of at least 70 percent by weight of vinylidene chloride with the remainder made up of, for example, acrolein and vinyl chloride, acrylic acid and acrylonitrile, alkyl acrylates and alkyl methacrylates, acrylonitrile and butadiene, acrylonitrile and itaconic acid, acrylonitrile and vinyl acetate, vinyl propionate or vinyl chloride, allyl esters or ethers and vinyl chloride, butadiene and vinyl acetate, vinyl propionate, or vinyl chloride and vinyl ethers and vinyl chloride. Quaternary polymers of similar monomeric compositions will also be known. Blends of such polymers may also be advantageously used.

The ethylene polymers used generally contain from about 100 to 58 percent by weight ethylene and between about 0 to 42 percent by weight of vinyl acetate and include the partially hydrolyzed derivatives thereof.

The second interpolymer used contains from about 0 to 91 percent by weight vinyl chloride and from about 100 to 9 percent by weight vinyl acetate, including the partially hydrolyzed derivatives thereof as well as interpolymers containing small amounts of ethylenically unsaturated comonomers such as maleic acid and the like.

The effect of the addition of the required types and amounts of the prescribed polymeric modifiers upon tear strength of vinylidene chloride polymer films will be illustrated by the following specific examples wherein all percentages and parts are by weight.

EXAMPLE 1

A crystalline copolymer composed of about 85 percent by weight vinylidene chloride and about 15 percent by weight of vinyl chloride was prepared by suspension polymerization, utilizing a mixture of lauroyl peroxide and benzoyl peroxide as the catalyst and a cellulose hydroxypropyl methyl ether having a viscosity of about 400 centipoises in a 2 percent aqueous solution of such ether measured at 20° C. The so-formed dried crystalline polymer was dry-blended with 4.5 parts by weight of acetyltributyl citrate.

Separate portions of the crystalline polymer as described herein, were then individually blended with varying amounts of a copolymer consisting of 73 percent by weight ethylene and 27 percent by weight vinyl acetate, said ethylene-vinyl acetate copolymer having a melt index of about 5; and with varying amounts of a copolymer consisting of from 86 to 91 percent by weight vinylchloride and 14 to 9 percent by weight vinyl acetate.

Samples of the polymer blends were subsequently individually thermally extruded using standard bubble techniques into oriented film having a thickness of about 0.001 of an inch, and the tear resistance of each film (in transverse direction) determined using an Elmendorf Tear Test (machine No. 202) under a 200 gm. load calculated as the stress in grams per mil thickness of the film sample.

Table I illustrates the composition of the polymer film samples and their respective resistance to tear. All values are average values of several tests.

EXAMPLE 2

A crystalline copolymer composed of about 73 percent by weight vinylidene chloride and about 27 percent by weight of vinyl chloride was prepared by emulsion polymerization, utilizing potassium persulfate as the catalyst and the dihexyl ester of the sodium salt of sulfosuccinic acid as the emulsifier in a manner well known in the art. The so-formed dried crystalline polymer was dry blended with 0.2 percent by weight magnesium oxide, 0.2 percent by weight stearamide and about 9 percent by weight of the plasticizer dibutyl sebacate.

The following Table II sets forth the composition of the individual polymer film samples and their respective resistance to tear. All values are average values of several tests.

The data presented in Tables I and II illustrate the unexpected enhancement in film tear strength obtained using the required mixtures of polymeric modifiers. Further, it has been found that such benefits are obtained without significant adverse effect upon the heat-sealability, transparency or shrinkability of the polymeric film materials and that, in addition, the use of such polymeric modifiers generally enhance the ease of fabrication and impact strength of films prepared from the prescribed polymeric compositions.

As previously indicated herein, the polymeric blends of this invention may include plasticizers, such as dioctyl phthalate and dibutyl sebacate and the like, generally in the range of about 2 to 10 percent by weight of the composition. In this regard, it has been discovered, which discovery forms part of the present invention, that the utilization of the described mixture of polymeric modifiers generally reduces the plasticizer requirement of the polymeric compositions thus providing for film materials having significantly lower oxygen transmission rates as compared to films prepared from the normally crystalline vinylidene chloride polymers absent such mixture of polymeric modifiers.

The following specific example will serve to illustrate such effect, wherein all percentages and parts are by weight.

EXAMPLE 3

In each of a series of experiments to individual portions of the crystalline vinylidene chloride copolymer of Example 2 (formulated as therein described) was added varying amounts of a copolymer consisting of about 67 percent by weight ethylene and from about 33 percent by weight of vinyl acetate, such copolymer having a melt index of about 25; along with varying amounts of a co-

TABLE I

| | | Sample No. | Ethylene-vinyl[1] acetate copolymer, percent by wt. | Vinyl chloride-vinyl acetate copolymer, percent by wt. | Tear resistance, grams per mil of film thickness |
|---|---|---|---|---|---|
| Series I | For comparison | 1 | None | None | 7.2 |
| | | 2 | 0.5 | None | 8.5 |
| | | 3 | None | [2] 0.5 | 8.0 |
| | The invention | 4 | 0.25 | [2] 0.25 | 10.0 |
| Series II | For comparison | 5 | None | None | 12 |
| | | 6 | 4 | None | 12.2 |
| | | 7 | None | [2] 4 | 11.2 |
| | The invention | 8 | 2 | [2] 2 | 77 |
| Series III | For comparison | 9 | None | None | 72 |
| | | 10 | 4 | None | 12.2 |
| | | 11 | None | [3] 4 | 9 |
| | The invention | 12 | 2 | [3] 2 | 50 |

[1] Copolymer of 73 percent by weight ethylene and 27 percent by weight vinyl acetate having a melt index of 5.
[2] Copolymer of 86 percent by weight vinyl chloride and 14 percent by weight vinyl acetate.
[3] Copolymer of 91 percent by weight vinyl chloride and 9 percent by weight vinyl acetate (partially hydrolyzed (to convert about 5.9 parts of the vinyl acetate to vinyl alcohol.

Separate portions of the crystalline polymer were then individually blended with varying amounts of an ethylene polymer consisting of from about 100 to 58 percent by weight ethylene and 0 to 42 percent by weight vinyl acetate, and with varying amounts of a copolymer consisting of from 0 to 86 percent by weight vinyl chloride and from 100 to 14 percent by weight vinyl acetate.

Samples of the polymer blends were then individually thermally extruded using standard bubble techniques into oriented film having a thickness of about 0.001 of an inch, and the tear resistance of each film determined as per the technique set forth in Example 1.

polymer of 86 percent by weight vinyl chloride and 14 percent by weight vinyl acetate.

Samples of the polymer blend were individually extruded using standard bubble techniques into oriented film having a thickness of about 0.001 of an inch, and the $O_2$ transmission of each sample determined as number of cc. transmission at STP/100 in.$^2$/24 hours/mil at 1 atm. driving force.

The following Table III sets forth the range of plasticizer required for adequate ease of processability with regard to the amounts of polymeric modifiers used and the resulting $O_2$ transmission values for the polymeric film samples.

TABLE II

| | | Sample No. | Ethylene polymer, percent by wt. | Vinyl chloride-vinyl acetate interpolymers, percent by wt. | Tear resistance, gms./mil in traverse direction |
|---|---|---|---|---|---|
| Series I | For comparison | 13 | None | None | 54 |
| | | 14 | [1] 6 | None | 35 |
| | | 15 | None | [2] 6 | 99 |
| | | 16 | [1] 12 | None | 27 |
| | | 17 | None | [2] 12 | 16 |
| | The invention | 18 | [1] 3 | [2] 3 | 151 |
| | | 19 | [1] 5 | [2] 3 | 163 |
| | | 20 | [1] 2 | [2] 4 | 184 |
| | | 21 | [1] 6 | [2] 6 | 129 |
| | | 22 | [3] 3 | [2] 3 | 154 |
| | | 23 | [4] 3 | [2] 3 | 163 |
| | | 24 | [5] 3 | [2] 3 | 198 |
| | | 25 | [1] 3 | [6] 3 | 189 |
| | | 26 | [1] 3 | [7] 3 | 180 |
| | | 27 | [8] 3 | [2] 3 | 159 |
| | | 28 | [9] 3 | [2] 3 | 163 |
| Series II | For comparison | 29 | None | None | 26 |
| | | 30 | [1] 6 | None | 35 |
| | | 31 | None | [10] 6 | 30 |
| | The invention | 32 | [1] 3 | [10] 3 | 74 |

[1] Copolymer of 73 percent by weight ethylene and 27 percent by weight vinyl acetate, melt index of 5.
[2] Copolymer of 86 percent by weight vinyl chloride and 14 percent by weight vinyl acetate.
[3] Copolymer of about 58 percent ethylene and 42 percent by weight vinyl acetate melt index of about 70.
[4] Partially hydrolyzed ethylene-vinyl acetate copolymer, hydroxyl value of 200 and melt index of 300.
[5] Copolymer of 67 percent by weight ethylene and 33 percent by weight vinyl acetate, melt index of about 25.
[6] Copolymer of 70 percent by weight vinyl chloride and 30 percent by weight vinyl acetate.
[7] Copolymer of 50 percent by weight vinyl chloride and 50 percent by weight vinyl acetate.
[8] Copolymer of 81–83 percent by weight ethylene and 17–19 percent by weight vinyl acetate, melt index 2.1–2.9.
[9] Branched polyethylene melt index 2, density 0.921.
[10] Homopolymer of vinyl acetate.

TABLE III

[Effect of modifier addition upon plasticizer requirement and effect upon $O_2$ transmission]

| | Plasticizer required, percent by wt. | Ethylene-vac copolymer, percent by wt. | Vinyl chloride-vac copolymer, percent by wt. | $O_2$ trans. of polymeric film |
|---|---|---|---|---|
| For comparison | 8.5–9 | None | None | 18 |
| This invention | 5–7 | 0.25–3 | 0.25–2 | 5–7 |
| | 1–5 | 3–5 | 2–4 | 2–5 |

When preparing the polymeric compositions of the invention, it is important that a thorough and complete intimate mixing of the polymeric ingredients is effected. This is best accomplished by blending the polymeric materials while they are in a solid powdered or pulverant form, e.g. where the additives are added individually or where the polymeric modifiers are pre-plasticized with the desired types and amounts of plasticizers to be used. It has been found, however, that utilization of a pre-plasticized vinyl chloride/vinyl acetate interpolymer may be somewhat detrimental to oxygen permeation of the shaped article. Further, any means suited for the purpose may be employed such as mixing the polymers in molten form. This is usually less desirable, though, because of the possibility of thermal degradation of the polymers when maintained at melting temperatures for extended periods.

Films and related shaped articles can be fabricated from the compositions of the invention by any of the conventionally employed fabricating or extruding techniques. Of particular advantage is to employ the bubble technique for making films in tubular form. In this regard, it has been found that the addition of the herein described modifying polymers significantly enhance extrusion efficiency and reduces the necessity for time-consuming cleaning of the extrusion dies; and further significantly reduces time consuming shut-downs resulting from frequent breaking of the film bubble.

Films prepared from the present compositions can be used in either oriented or unoriented condition. Thus, unoriented films are especially well suited for preparing laminate structures. The unoriented films provide excellent extensibility to the laminate structure as well as providing desirable permeability.

It has also been discovered, which discovery forms another part of this invention, that the polymeric compositions described herein form films comprised of individual and separable film layers thus providing for a means of obtaining multi-layer films by extrusion through conventional single layer extrusion dies.

The compositions of the present invention are also particularly useful in forming monofilament having desirably enhanced elongation with resulting resistance to break when being wound on a loom by conventional techniques. The following Example 4 will serve to illustrate such effect, wherein all percentages and parts are by weight.

EXAMPLE 4

In each of a series of experiments, to individual portions of the crystalline vinylidene chloride copolymers of Example 1 (formulated essentially as therein described) was added from 0 to 3 percent by weight of a copolymer of 73 percent by weight ethylene and 27 percent by weight vinyl acetate, such copolymer having a melt index of 5; with from 0 to 3 percent by weight of a copolymer of 86 percent by weight vinyl chloride and 14 percent by weight vinyl acetate.

Samples of the polymer blends were subsequently individually thermally extruded into monofilament, using conventional techniques, and the tensile and knot strength and elongation of such monofilament determined.

Table IV sets forth the amounts of polymeric modifiers used and the physical properties of the monofilament materials.

The data in Table IV illustrates the significantly enhanced percent elongation obtained in monofilament prepared from the compositions of the present invention, which increased elongation permits winding of the monofilament on a loom by conventional procedures with significantly reduced incidence of breaking.

The compositions of the present invention are also useful in other processes, such as molding, slot extrusion, and other thermal fabrication techniques, to form films, fibers, foils, molded articles, and other forms having the herein described superior properties.

TABLE IV

| | Sample No. | Ethylene-vinyl acetate copolymer, percent by wt. | Vinyl chloride-vinyl acetate copolymer, percent by wt. | Physical properties of monofilament, p.s.i. | | |
|---|---|---|---|---|---|---|
| | | | | Tensile strength | Knot strength | Elongation |
| For comparison | 29 | None | None | 39,280 | 22,080 | 18 |
| The invention | 30 | 3 | 3 | 36,596 | 22,550 | 27.5 |

What is claimed is:

1. A polymer composition consisting essentially of a blend of:
   (1) from about 88 to 99.5 percent by weight, based on the total weight of the composition, of a normally crystalline vinylidene chloride polymer containing from about 70 to about 95 percent by weight of vinylidene chloride interpolymerized with from about 30 to about 5 percent by weight of at least one monoethylenically unsaturated monomer copolymerizable with vinylidene chloride,
   (2) from about 0.25 to 6 percent by weight of the composition of an ethylene polymer consisting essentially of (a) from about 100 to 58 percent by weight of ethylene and (b) from about 0 to 42 percent by weight of vinyl acetate; and,
   (3) from about 0.25 to about 6 percent by weight of the composition of an interpolymer consisting essentially of from about 0 to 91 percent by weight of vinyl chloride and from about 100 to 9 percent by weight of vinyl acetate.

2. The composition of claim 1 wherein said normally crystalline vinylidene chloride polymer is a copolymer of vinylidene chloride and vinyl chloride.

3. The composition of claim 2 wherein said normally crystalline vinylidene chloride polymer is a copolymer of about 37 percent by weight of vinylidene chloride and about 27 percent by weight of vinyl chloride.

4. The composition of claim 2 wherein said normally crystalline vinylidene chloride polymer is a copolymer of about 85 percent by weight of vinylidene chloride and about 15 percent by weight vinyl chloride.

References Cited

UNITED STATES PATENTS 3,322,862  5/1967  Havens et al. _____ 260—897
3,075,946  1/1963  Zupic _____ 260—45.5

SAMUEL H. BLECH, Primary Examiner

C. J. SECCURO, Assistant Examiner

U.S. Cl. X.R.

260—31.8, 889, 899

PO-1050
(5/69)

UNITED STATES PATENT OFFICE
CERTIFICATE OF CORRECTION

Patent No. 3,565,975        Dated 23 February 1971

Inventor(s) Frank V. Goff, Fred Stevenson, and William H. Wineland

It is certified that error appears in the above-identified patent and that said Letters Patent are hereby corrected as shown below:

In column 8, Claim 3, line 16 change "37" to -- 73 --.

Signed and sealed this 13th day of July 1971.

(SEAL)
Attest:

EDWARD M. FLETCHER, JR.
Attesting Officer

WILLIAM E. SCHUYLER, JR.
Commissioner of Patents